United States Patent
Katz et al.

(10) Patent No.: US 10,135,977 B1
(45) Date of Patent: Nov. 20, 2018

(54) SYSTEMS AND METHODS FOR OPTIMIZATION OF INTERACTIVE VOICE RECOGNITION SYSTEMS

(71) Applicant: Nice Ltd., Ra'anana (IL)

(72) Inventors: Natan Katz, Tel Aviv (IL); Gennadi Lembersky, Nesher (IL); Roy Klein, Rishon Lezion (IL)

(73) Assignee: NICE LTD., Ra'Anana (IL)

( * ) Notice: Subject to any disclaimer, the term of this patent is extended or adjusted under 35 U.S.C. 154(b) by 0 days.

(21) Appl. No.: 15/821,957

(22) Filed: Nov. 24, 2017

(51) Int. Cl.
*H04M 3/493* (2006.01)

(52) U.S. Cl.
CPC ...... *H04M 3/493* (2013.01); *H04M 2203/355* (2013.01); *H04M 2203/551* (2013.01)

(58) Field of Classification Search
CPC .. H04M 3/5166; H04M 3/493; H04M 3/5191; H04M 3/5175; H04M 2203/551; H04M 3/28; H04M 3/5183; H04M 15/41; H04M 2250/56; H04M 3/5232; H04M 1/72577; H04M 2201/40; H04M 3/42221; H04M 3/4936; H04M 3/4938; H04M 3/51; H04M 3/5238

USPC ..... 379/1.02, 265.02, 265.09, 265.12, 88.01, 379/88.11, 88.18

See application file for complete search history.

(56) References Cited

U.S. PATENT DOCUMENTS

| | | | |
|---|---|---|---|
| 6,665,644 B1* | 12/2003 | Kanevsky | G10L 17/26 704/246 |
| 8,761,373 B1* | 6/2014 | Raghavan | H04M 3/4936 379/111 |
| 8,761,737 B2* | 6/2014 | Clarke | H04L 51/34 455/414.1 |
| 2015/0220619 A1* | 8/2015 | Gray | G06F 17/30598 707/738 |
| 2016/0065738 A1* | 3/2016 | Schwartz | H04M 3/5175 379/265.03 |
| 2017/0111506 A1* | 4/2017 | Strong | G06N 99/005 |
| 2017/0116173 A1* | 4/2017 | Lev-Tov | H04M 3/4936 |

* cited by examiner

*Primary Examiner* — Akelaw Teshale
(74) *Attorney, Agent, or Firm* — Pearl Cohen Zedek Latzer Baratz LLP

(57) ABSTRACT

Methods and systems for optimization of interactive voice recognition (IVR) system processes are provided. One or more desired optimization parameters can be determined based on an IVR transaction log that includes a plurality of IVR journeys. The IVR journeys can be filtered, transformed into vectors and/or clustered.

14 Claims, 3 Drawing Sheets

SYSTEMS AND METHODS FOR OPTIMIZATION OF INTERACTIVE VOICE RECOGNITION SYSTEMS

FIELD OF THE INVENTION

The invention relates generally to interactive voice recognition (IVR") system systems. In particular, determining one or more optimization parameters based on IVR transactions.

BACKGROUND OF THE INVENTION

Currently, IVR systems interact with users to execute tasks desired by the user. For example, a user can call a bank that uses an IVR system to allow for multiple user tasks. The IVR system can output menu options for a user to select from regarding the purpose of the user's call. For example, "press or say 1 for account balance," "press or say 2 for customer service," and "press or say 3 for location and hours."

IVR systems can include complex sets of menus to, for example, allow users to complete complex tasks. For example, an IVR system can allow a user to order a part for a vehicle, or book a flight to a particular location at a particular time.

Some IVR system transactions result in successful completion of the task desired by the user. Some IVR system transactions result in escalation to an agent to complete the task, e.g., an unsuccessful completion. The path taken by the IVR system for a given transaction (e.g., the IVR journey) can be different for two users using the same IVR system, desiring to complete the same task. In some scenarios, for two users using the same IVR system, desiring to complete the same task, one user's transaction can be successful while the other user's transaction can be unsuccessful. It can be desirable to review IVR transaction logs to determine one or more parameters that can contribute to optimization of IVR systems.

Current review of IVR transaction logs can include a human analyzer reading through the transaction logs and coming to a conclusion regarding reasons for success or failure of the IVR transaction based on, for example, their own knowledge. The human analyzer may have to read through many logs to come to a conclusion. In some scenarios, the number of logs that the human analyzer may read through to come to a conclusion can be so large that the human analyzer does not make an accurate conclusion. This current method can be inaccurate, not reproducible, and fail to yield results that can be used by the IVR system to improve IVR system performance.

SUMMARY OF THE INVENTION

One advantage of the invention can include an ability to analyze IVR transaction logs to yield results that can be used to improve IVR system performance. Another advantage of the invention can include an ability to analyze IVR transaction logs in a reproducible manner. Another advantage of the invention can include an ability to consistently analyze IVR transaction logs.

Another advantage of the invention can include an ability to identify one or more patterns frequently occurring in failed IVR journeys, by for example, an ability to process a number of logs that a human cannot analyze. Another advantage of the invention is that determinations regarding the IVR journeys can be made based on the actual IVR log data in contrast to a human analyzer that can have subjective knowledge that can be biased to a specific outcome or biased based on the human analyzer's specific experience.

In one aspect, the invention involves a method for optimization of interactive voice recognition (IVR) system processes. The method involves receiving, from the IVR system, an IVR transaction log. The method also involves receiving a plurality of IVR menus. The method also involves extracting a plurality of IVR journeys from the IVR transaction log that correspond to the plurality of IVR menus. The method also involves transforming each of the plurality of IVR journeys and corresponding prompts into a vector based on a corresponding model that is specific to the particular IVR menu for the particular IVR journey to create a plurality of IVR journey vectors. The method also involves clustering the IVR journey vectors and determining one or more desired optimization parameters based on the clustered IVR journey vectors.

In some embodiments, the IVR transaction log is received from the IVR system. In some embodiments, the plurality of IVR menus are menus of interest. In some embodiments, each corresponding model is based on a deep multimodal sequence auto-encoder (DMSA) that was trained with previous IVR transaction logs from the IVR system. In some embodiments, the clustering is K-Means clustering. In some embodiments, an optimal number of clusters is a value of K that maximizes a Silhouette metric.

In some embodiments, the one or more optimization parameters includes a containment rate.

In some embodiments, clustering the plurality of IVR journeys involves for each menu in each cluster: a) determining a mean number of occurrences, $\mu$, of a particular menu in the plurality of IVR journeys, b) determining a standard deviation, $\sigma$, of mean number of occurrences of a particular menu, $\mu$, from the plurality of IVR journeys, c) determine a mean number of occurrences, X, of a particular menu in the clustered IVR journey vectors, d) labeling the particular cluster with three Z-score values, the three Z-score values are selected from all Z-score values for the IVR journeys with menus having the of a particular cluster of the menus IVR journeys within the cluster having the highest Z score.

In another aspect, the invention includes one or more non-transitory computer-readable storage media comprising instructions that are executable to cause one or more processors to: receive an IVR transaction log, receive a plurality of IVR menus, extract a plurality of IVR journeys from the IVR transaction log that correspond to the plurality of IVR menus, transform each of the plurality of IVR journeys and corresponding prompts into a vector based on a corresponding model that is specific to the particular IVR menu for the particular IVR journey to create a plurality of IVR journey vectors, cluster the IVR journey vectors, and determine one or more desired optimization parameters based on the clustered IVR journey vectors.

In some embodiments, the instructions when executed further cause one or more processors to receive the IVR transaction log from the IVR system. In some embodiments, the plurality of IVR menus are menus of interest. In some embodiments, each corresponding model is based on a deep multimodal sequence auto-encoder (DMSA) that was trained with previous IVR transaction logs from the IVR system.

In some embodiments, the clustering is K-Means clustering. In some embodiments, an optimal number of clusters is a value of K that maximizes a Silhouette metric. In some embodiments, the one or more optimization parameters includes a containment rate.

In some embodiments, the instructions when executed further cause one or more processor clustering the plurality of IVR journeys to for each menu in each cluster: a) determine a mean number of occurrences, $\mu$, of a particular menu in the plurality of IVR journeys, b) determine a standard deviation, $\sigma$, of mean number of occurrences of a particular menu, $\mu$, from the plurality of IVR journeys, c) determine a mean number of occurrences, X, of a particular menu in the clustered IVR journey vectors, and d) label the particular cluster with three Z-score values, the three Z-score values are selected from all Z-score values for the IVR journeys with menus having the of a particular cluster of the menus IVR journeys within the cluster having the highest Z score.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
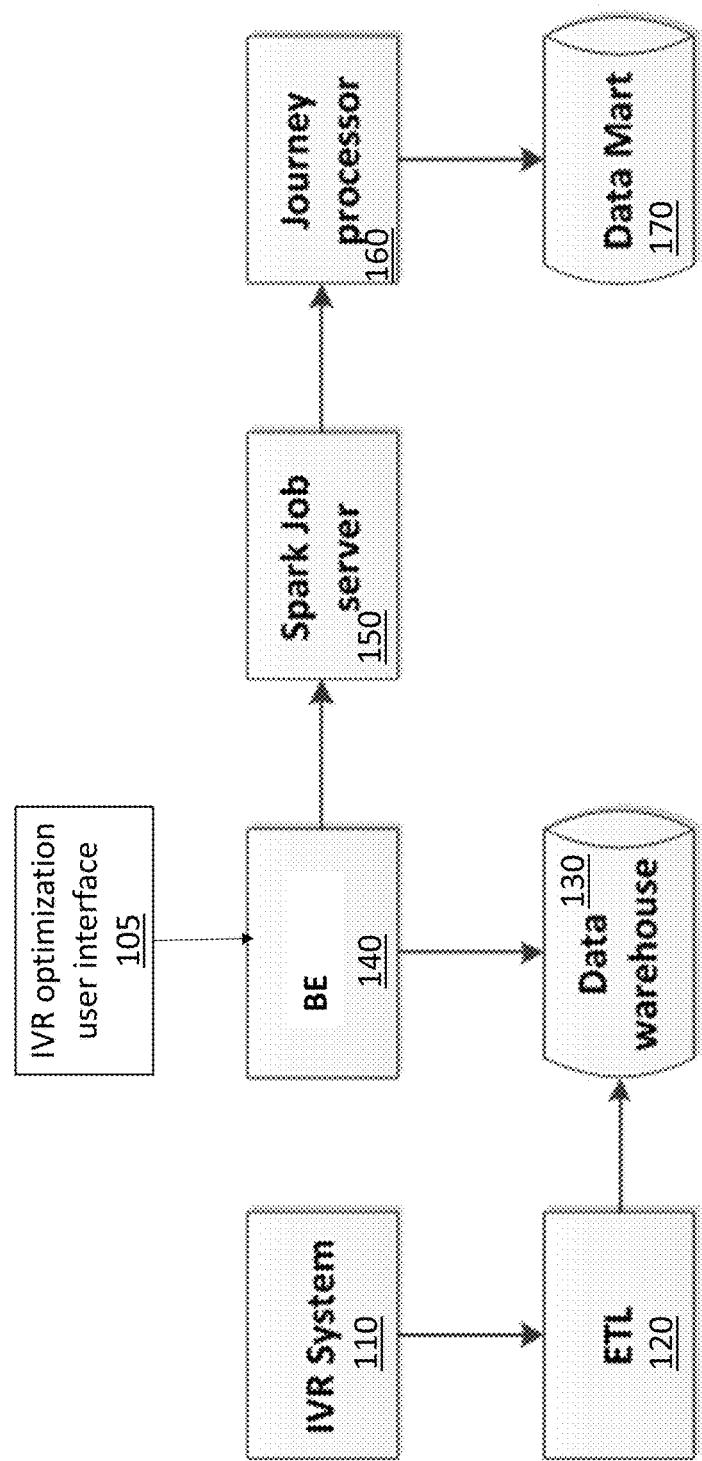
FIG. 1 is a diagram of a system for optimization of IVR system processes, according to an illustrative embodiment of the invention.

FIG. 1 is a diagram of a system for optimization of IVR system processes, according to an illustrative embodiment of the invention. The system can include a IVR optimization user interface 105, an IVR system 110, an Extract-Transform-Load (ETL) module 120, a data warehouse module 130 (e.g., data storage), a backend server 140, a spark job server 150, an IVR journey processor 160, and a data mart module 170.

The ETL module 120 can collect data from the IVR system 110 (e.g., one or more IVR transaction journeys). The collected data from the IVR system 110 can be stored in the data warehouse module 130 (e.g., to create an IVR transaction log). In various embodiments, the data collected from the IVR system is collected on a daily basis, weekly, and/or any desired increment of time. In some embodiments, the data is collected in real-time. The spark job server 150 can enrich and/or process the collected data and store the collected data in the data mar module 170. For example, user-related information can be added to the data. In other examples, type of mobile phone, plan details, and/or survey scores can be added to the data.

A user (e.g., an analyst, another computing system, or any combination thereof) can use the IVR optimization user interface 105 to specify request optimization process and specify one or more IVR menus of interest.

The request can be transmitted to the backend server 140. The backend server 140 can transmit a request to the spark job server 150 to execute a method for optimization of the IVR system processes (e.g., as described below in FIG. 2 and FIG. 3). The spark job server 150 can communicate with the IVR journey processor 160. The IVR journey processor can retrieve relevant IVR journeys from the data mart module 170, execute the method for optimization, and return the results to the user via the IVR optimization user interface 105.

The spark job server 150 can return results to the backend server 140.

As is apparent to one of ordinary skill in the art, the components in FIG. 1 are for example purposes only, and that they can be implemented on one or more separate computing devices, and functionality can be implemented on the one or more computing devices in any combination.

Figure 2:
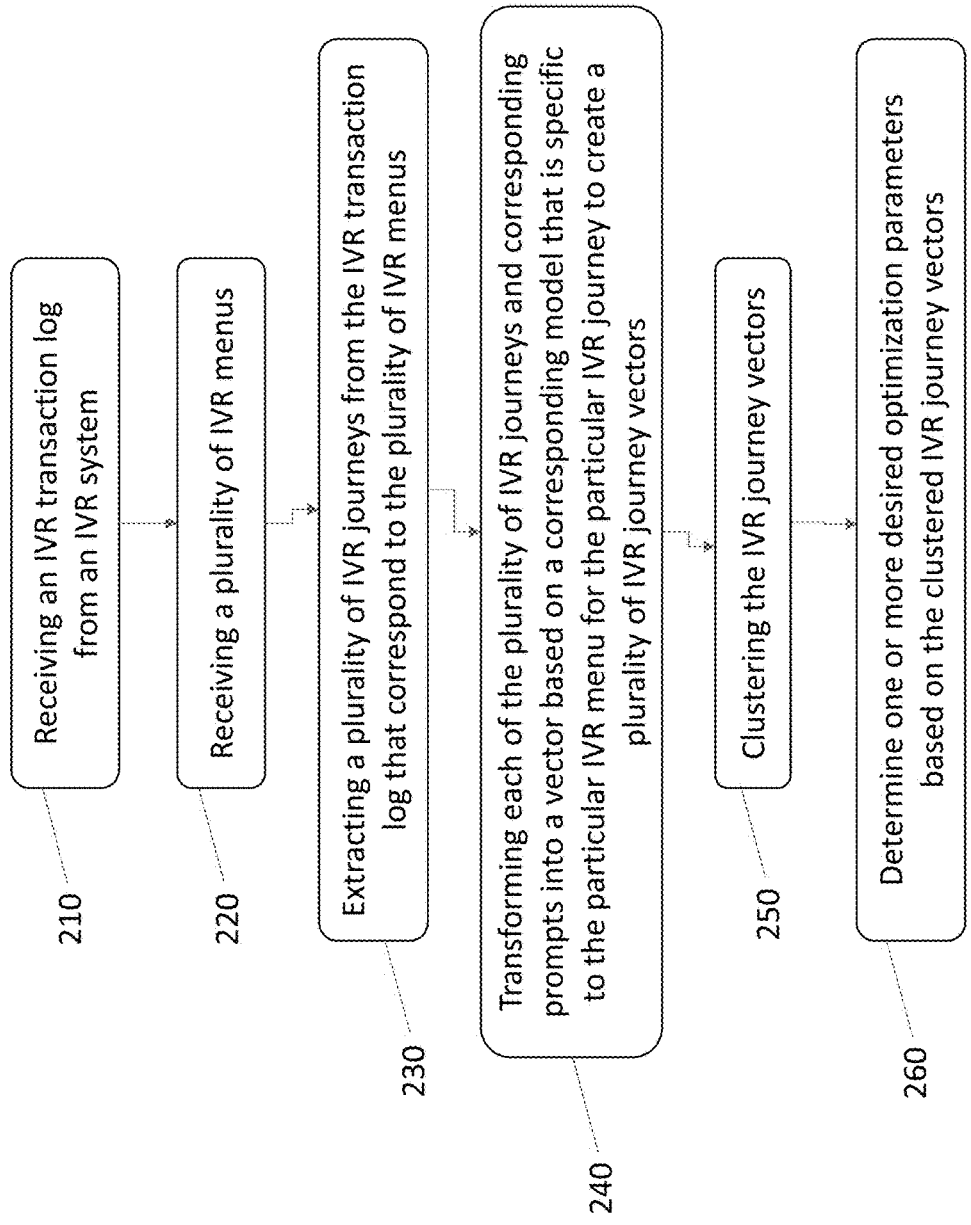
FIG. 2 is a flow chart of a method for optimization of IVR system processes, according to an illustrative embodiment of the invention.

FIG. 2 is a flow chart of a method for optimization of IVR system processes, according to an illustrative embodiment of the invention. The method can involve receiving, from the IVR system (e.g., the IVR system 110, as described above in FIG. 1), an IVR transaction log (Step 210). In some embodiments, the IVR transaction log can include sessions (e.g., IVR journeys). Each session can include a session identifier, a customer identifier, a start time and/or an end time. In some embodiments, the IVR transaction log can include events. Each event can include a selection made by the user.

In some embodiments, the IVR transaction logs are received from one or more computer memories. In some embodiments, the IVR transaction logs are received from multiple IVR systems. In various embodiments, the IVR transaction logs are received from one or more computer memories, one or more IVR systems, or any combination thereof. In some embodiments, the IVR transaction logs are historical over a time period of 1 day-60 days. In some embodiments, the IVR transaction logs are historical over any time period (e.g., any time period that is desired).

The method can also involve receiving a plurality of IVR menus (Step 220). The plurality of IVR menus. The plurality of IVR menus can be based a predetermined set of IVR menus that can exist in the IVR transaction logs. For example, a first IVR system can be for a billing application of an organization and a second IVR system can be for a support application. For example, a first IVR system can be for an airline, while a second IVR system can be for a bank.

In this example, the first IVR system can have menus that correspond to airline items, while the second IVR system can have menus that correspond to banks. As is apparent to one of ordinary skill in the art, menus and particular menu items can overlap between various IVR systems and/or can be unique.

The predetermined set of IVR menus can be generated based on the received IVR transaction log, or an IVR transaction log previously recorded by the IVR system. The IVR transaction log can include a comma separated list of menu identifiers (e.g., numerical representation of a menu item) for each IVR journey. Table 1, shown below, is an example of an IVR transaction log for a first journey and a second journey.

TABLE 1

| Journey # (Sequence #) | Menu identifiers |
| --- | --- |
| IVR Journey 1 (Sequence 1) | 78743, 78754, 87773, 89920, 88220, 75632 |
| IVR Journey 2 (Sequence 2) | 78743, 78754, 75432, 81234, 73424, 76432, 79234 |

Each journey can be referred to as a sequence (e.g., Seq1 and Seq2, respectively). IVR Journey 1 includes menu identifiers 78743, 78754, 87773, 89920, 88220, 75632; and IVR Journey 2 includes menu identifiers 78743, 78754, 75432, 81234, 73424, 76432, 79234. Thus, in this example, the predetermined set of IVR menus is all of the menu identifiers in IVR Journey 1 and IVR Journey 2. In some embodiments, the user can specify a list of IVR menus.

The method can also involve extracting a plurality of IVR journeys from the IVR transaction log that correspond to the plurality of IVR menus (Step 230). As described above in Step 220, a predetermined plurality of IVR menus can be received. Extracting the plurality of IVR journeys can involve determining for each IVR menu identified in the plurality of IVR menus received (or extracted) in step 220, all IVR journeys that include the particular IVR menu identifier, and the IVR menu identifier's position. The plurality of IVR menus received (or extracted) in step 220 can be an ordered list. Table 2, shown below, is an example of a first menu identifier and a second menu identifier with their corresponding IVR journeys (e.g., sequence numbers).

TABLE 2

| Menu Identifier | Journey #'s (Sequence #'s) |
| --- | --- |
| 78743 | seq1:1, seq2:1, seq5:2 |
| 78754 | seq1:5, seq2:2, seq10:12 |

As shown in Table 2, the IVR journeys having a particular menu identifier can be grouped together. As shown in Table 2, menu identifier 78743 can be in sequence 1 in position 1 (seq1:1), sequence 2 in position 1 (seq2:1), and sequence 5 in position 2 (seq5:2). Menu identifier 78754 can be in sequence 1 in position 5 (seq1:5), sequence 2 in position 2 (seq2:2), and sequence 10 position 12 (seq10:12). In some embodiment, each sequence is reviewed to verify that the corresponding menu identifier position is accurate. In some embodiments, the menu identifiers and their corresponding sequence numbers are sorted in ascending order to create a reversed index of menu identifiers and corresponding sequence numbers. The reverse index can be used to extract the plurality of IVR journeys from the IVR transaction log by matching each journey (e.g., sequence number) in the IVR transaction log journey to its corresponding menu identifier in the reverse index. In this manner, the IVR transactions of interest (e.g., transactions having menus that correspond to desired menus) can be considered. The extracted plurality of IVR journeys can be stored in a computer memory.

In some embodiments, each IVR journey within the IVR transaction log that has a menu identifier that matches one of the menu identifiers in the plurality of IVR menus is extracted from the IVR transaction log.

The method can also involve transforming each of the plurality of IVR journeys (e.g., the extracted plurality of IVR journeys) and corresponding prompts (e.g., prompts that correspond to the menu identifiers in the plurality of IVR journeys) into a vector based on a corresponding model that is specific to the particular IVR menu for the particular IVR journey to create a plurality of IVR journey vectors (Step 240). The plurality of IVR journeys vectors can be determined as shown in FIG. 3.

Figure 3:
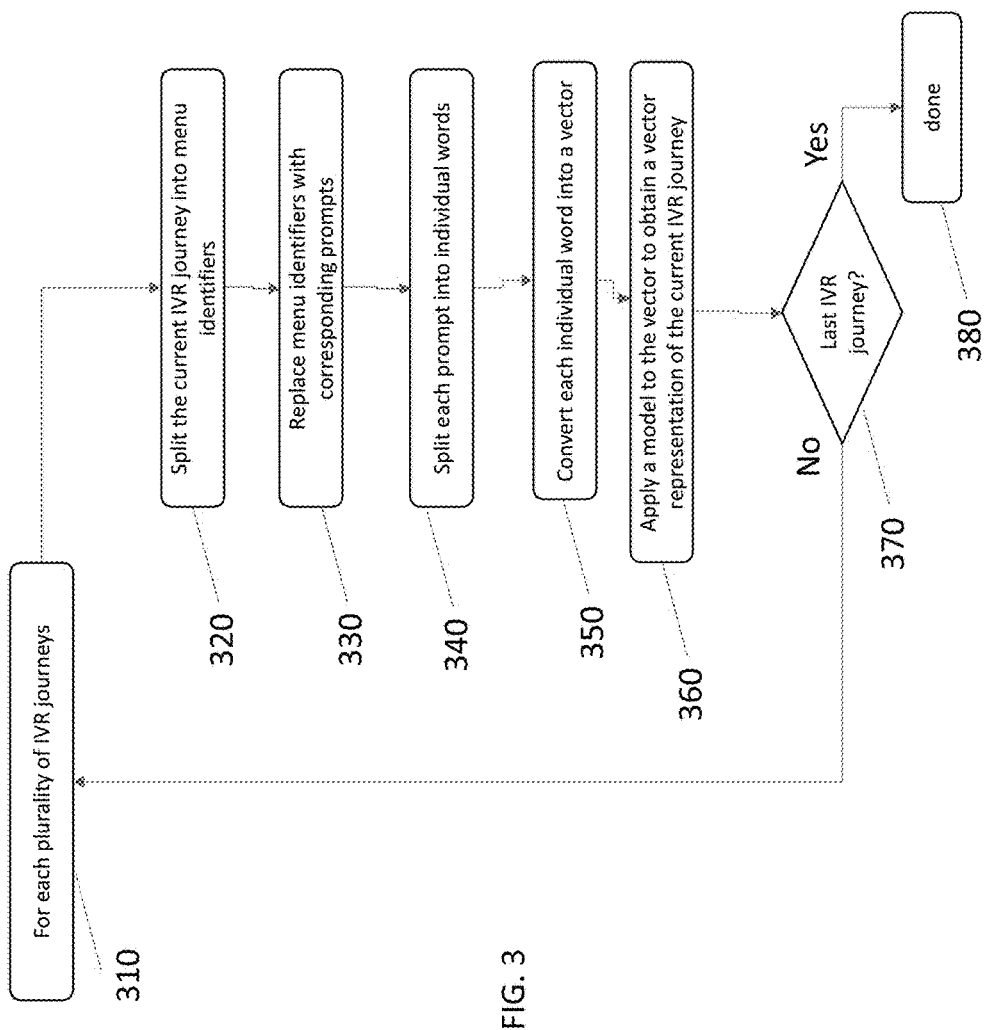
FIG. 3 is a flow chart of a method for creating a plurality of IVR journey vectors, according to an illustrative embodiment of the invention It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

Turning to FIG. 3, FIG. 3 shows an example of a method for creating the plurality of IVR journey vectors, according to an illustrative embodiment of the invention. The method can involve for each of the plurality of IVR journey (Step 310), splitting the current IVR journey into menu identifiers (Step 320). The method can also involve replacing the menu identifiers with their corresponding prompts (Step 330). The method can also involve splitting each prompt into individual words (Step 340). The method can also involve converting each individual word into a vector (Step 350). The method can also involve applying a model to the vector to obtain a vector representation of the current IVR journey (Step 360). In some embodiments, the model is trained based on a deep multi-model sequence auto-encoder (DMSA). The model can be created by using the IVR transaction log as described above as inputs to the DMSA trained model. The model can be created by using an IVR transaction log of IVR transactions captured by the same IVR system at a different period of time. Training the model can involve taking each vector created in step 350 above, and averaging all the values for all of the vectors, concatenating all of the vectors and inputting the average and the concatenated vector into the DMSA training module to create a trained model.

If the current IVR journey is the last IVR journey (Step 370), then the method can end. Otherwise, continue to the next IVR journey.

Turning back to FIG. 2, the method can involve clustering the IVR journey vectors (Step 250). Clustering the IVR journey vectors can involve applying a K-Means clustering algorithm to the IVR journey vectors. In some embodiments, an optimal number of clusters is determined based on a value of K that maximizes a Silhouette metric.

The method can also involve determining one or more desired optimization parameters based on the clustered IVR journey vectors (Step 260). The one or more desired optimization parameters can include containment rate, authentication rate, drop rate, repeat rate, lengthy journey rate, or any combination thereof.

The containment rate can be described as the number of IVR journeys ended successfully without transfer to an agent (K) in a set of IVR journeys size N divided by N. The authentication rate can be described as a number of IVR journeys successfully authenticated over the total number of IVR journeys. The drop rate can be described as the number of dropped IVR journeys over the all IVR journeys. The repeat rate can be described as the number of IVR journeys with repeated menus over all IVR journeys. The lengthy journey rate can be described as the number of IVR journeys that have more than a predefined number of events. The predefined number of events can be input by a user or based on a number of events that are beyond a number of average events for a particular journey type.

In some embodiments, a Z-score is determined to identify one or more menus in each cluster that most heavily influence the optimization parameters. For example, for an optimization parameter of a containment rate, the Z-score can indicate which menus in each cluster most heavily influenced the containment rate.

The Z-score can be determined by i) determining a mean number of occurrences, $\mu$, of the menu identifier in all IVR journey vectors; ii) determining a standard deviation, $\sigma$, of a number of occurrences of the menu identifier in all IVR journeys vectors; iii) determine a mean number of occurrences, X, of the menu identifier in a particular cluster; and iv) determine the Z-Score, where the Z-Score=$|X-\mu|/\sigma$.

In some embodiments, the menus can be sorted by Z-score. In some embodiments, menus with the highest Z-score are displayed to a user (e.g., 1, 2, 3 or any number of the highest Z-scores).

The above-described methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HyperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Some embodiments of the present invention may be embodied in the form of a system, a method or a computer program product. Similarly, some embodiments may be embodied as hardware, software or a combination of both.

Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for optimization of interactive voice recognition (IVR) system processes, the method comprising:
   receiving, from the IVR system, an IVR transaction log;
   receiving a plurality of IVR menus;
   extracting a plurality of IVR journeys from the IVR transaction log that correspond to the plurality of IVR menus;
   transforming each of the plurality of IVR journeys and corresponding prompts into a vector based on a corresponding model that is specific to the particular IVR menu for the particular IVR journey to create a plurality of IVR journey vectors;
   clustering the IVR journey vectors by:
      for each menu in each cluster:
         a) determining a mean number of occurrences, $\mu$, of a particular menu in the plurality of IVR journeys,
         b) determining a standard deviation, $\sigma$, of mean number of occurrences of a particular menu, $\mu$, from the plurality of IVR journeys,
         c) determining a mean number of occurrences, X, of a particular menu in the clustered IVR journey vectors,
         d) labeling the particular cluster with three Z-score values, the three Z-score values are selected from all Z-score values for the IVR journeys with menus having the of a particular cluster of the menus IVR journeys within the cluster having the highest Z score; and
   determining one or more desired optimization parameters based on the clustered IVR journey vectors.

2. The method of claim 1 wherein the IVR transaction log is received from the IVR system.

3. The method of claim 1 wherein the plurality of IVR menus are menus of interest.

4. The method of claim 1 wherein each corresponding model is based on a deep multimodal sequence auto-encoder (DMSA) that was trained with previous IVR transaction logs from the IVR system.

5. The method of claim 1 wherein the clustering is K-Means clustering.

6. The method of claim 5 wherein an optimal number of clusters is a value of K that maximizes a Silhouette metric.

7. The method of claim 1 wherein the one or more optimization parameters includes a containment rate.

8. One or more non-transitory computer-readable storage media comprising instructions that are executable to cause one or more processors to:
receive an IVR transaction log;
receive a plurality of IVR menus;
extract a plurality of IVR journeys from the IVR transaction log that correspond to the plurality of IVR menus;
transform each of the plurality of IVR journeys and corresponding prompts into a vector based on a corresponding model that is specific to the particular IVR menu for the particular IVR journey to create a plurality of IVR journey vectors;
cluster the IVR journey vectors by;
for each menu in each cluster:
 a) determine a mean number of occurrences, $\mu$, of a particular menu in the plurality of IVR journeys,
 b) determine a standard deviation, $\sigma$, of mean number of occurrences of a particular menu, $\mu$, from the plurality of IVR journeys,
 c) determine a mean number of occurrences, X, of a particular menu in the clustered IVR journey vectors,
 d) label the particular cluster with three Z-score values, the three Z-score values are selected from all Z-score values for the IVR journeys with menus having the of a particular cluster of the menus IVR journeys within the cluster having the highest Z score; and
determine one or more desired optimization parameters based on the clustered IVR journey vectors.

9. The one or more non-transitory computer-readable storage media of claim 8 where the instructions when executed further cause one or more processors to receive the IVR transaction log from the IVR system.

10. The one or more non-transitory computer-readable storage media of claim 8 wherein the plurality of IVR menus are menus of interest.

11. The one or more non-transitory computer-readable storage media of claim 8 wherein each corresponding model is based on a deep multimodal sequence auto-encoder (DMSA) that was trained with previous IVR transaction logs from the IVR system.

12. The one or more non-transitory computer-readable storage media of claim 8 wherein the clustering is K-Means clustering.

13. The one or more non-transitory computer-readable storage media of claim 8 wherein an optimal number of clusters is a value of K that maximizes a Silhouette metric.

14. The one or more non-transitory computer-readable storage media of claim 8 wherein the one or more optimization parameters includes a containment rate.

\* \* \* \* \*